INVENTORS
ROBERT J. FALLERT
JOSEPH F. DUSEK

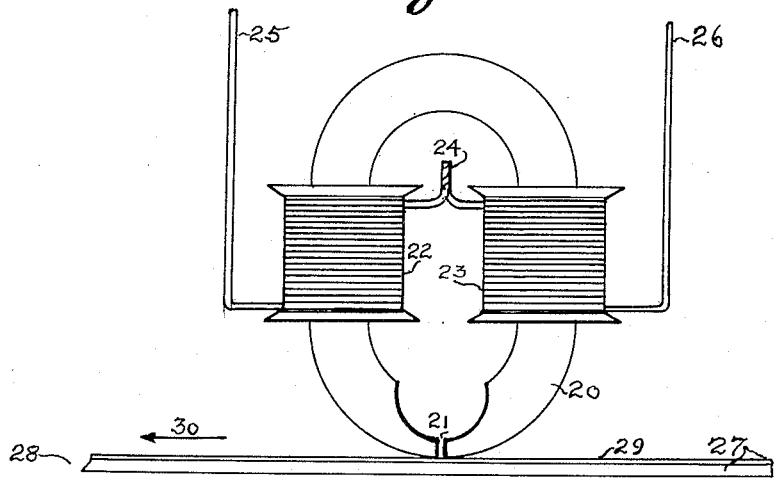

BY Ward Crosby & Neal
ATTORNEY

April 17, 1951

J. F. DUSEK ET AL 2,549,071

SPACE RESERVATION SYSTEM

Filed Sept. 10, 1949

INVENTORS
ROBERT J. FALLERT
JOSEPH F. DUSEK

BY Ward Crosby & Neal
ATTORNEY

April 17, 1951 J. F. DUSEK ET AL 2,549,071
SPACE RESERVATION SYSTEM
Filed Sept. 10, 1949 11 Sheets—Sheet 9

INVENTORS
ROBERT J. FALLERT
JOSEPH F DUSEK
BY Ward Crosby & Neal
ATTORNEY

April 17, 1951  J. F. DUSEK ET AL  2,549,071
SPACE RESERVATION SYSTEM
Filed Sept. 10, 1949  11 Sheets-Sheet 10

INVENTORS
ROBERT J. FALLERT
JOSEPH F. DUSEK
BY Ward Crosby & Neal
ATTORNEY

April 17, 1951  J. F. DUSEK ET AL  2,549,071
SPACE RESERVATION SYSTEM

Filed Sept. 10, 1949  11 Sheets-Sheet 11

INVENTORS
ROBERT J. FALLERT
JOSEPH F. DUSEK
BY Ward Crosby & Neal
ATTORNEY

Patented Apr. 17, 1951

2,549,071

UNITED STATES PATENT OFFICE 2,549,071

SPACE RESERVATION SYSTEM

Joseph F. Dusek, Long Island City, and Robert J. Fallert, New York, N. Y., assignors to Lawton Products Company, Inc., New York, N. Y., a corporation of New York Application September 10, 1949, Serial No. 115,078

11 Claims. (Cl. 177—353)

This invention pertains to improvements in apparatus for the storing, scanning, adding, subtracting, reproducing, selecting and interpreting of coded information, employing an endless magnetic tape, drum, disk or equivalent magnetic or magnetizable medium, to store the data.

More particularly, in accordance with the apparatus of the invention, a datum is recorded and stored on the magnetic tape or the like, in the form of one cycle of alternating current electrical signal, followed by a space of unmagnetized area on the tape equivalent to the space of one cycle. The apparatus comprises means for the recording and storage of such data, which will record them quickly, hold them firmly until erasure, scan and interpret them quickly, erase them quickly, so that the erased areas will be immediately available for the recording and storage of new or additional information. As above stated, the coded information is recorded on a continuous belt, magnetic drum, disk or the like, of a magnetizable medium, such, for example, as a film of iron oxide disposed on a paper or other flexible tape, which belt, drum, disk or the like, is divided lengthwise or circumferentially, into rows or "channels" and crosswise or radially into "lines." A magnetized area or so-called magnetic "pulse" representing a datum of information, may or may not be recorded at the intersection of each particular channel and line, depending on the coding of the information to be recorded. Each channel and line of information is separated from that next adjacent by a space. Basically there are two different systems or arrangements for rapidly locating a particular line of data in a magnetic channel; one is by its position in relation to a pre-established reference point or pulse on the tape; and two, by its particular characteristics irrespective of its position from such a pre-established reference point. The present invention employs both the aforesaid systems or arrangements: (1) by counting the lines of data from a reference point; and (2) by use of coincidence-anti-coincidence circuits, for locating a particular datum according to its characteristics.

The apparatus of the invention is particularly adapted for the rapid handling of Pullman passenger car reservations in large railway terminals, and the invention embraces, as one of its important and novel features, a specific arrangement of apparatus in accordance with the invention, particularly adapted for such purposes.

The handling of Pullman car and passenger reservations has heretofore been effected by clerks scanning and entering in pencil the desired or requested space or reservation, on diagram cards, which work is carried out manually by such clerks in a so-called "diagram room." For example, when a prospective passenger's telephone or personal request for a particular type of space is received by a reservation clerk in one of the large railway terminals, it is repeated by this clerk, by telephone, to one of a large number, for example, 100 or so, other clerks handling about 250,000 "units of reservation" monthly in the diagram room above referred to. This diagram room is ordinarily located at a point remote from the reservation clerk, the latter being located ordinarily at the ticket window, while the diagram room is usually located on one of the floors above in the railway terminal. Each diagram clerk is seated before a slidable or rotatable type of pigeon-holed table, which handles the particular train to the particular point for which reservation has been requested. From one of these pigeon-holes, the diagram clerk selects a pad of 30 diagram cards, assuming them not to be in use for the moment by some other clerk, which cards carry the units of reservation of one car of the train in question for the ensuing 30 days. The diagram clerk then selects the card for a particular day for which space has been requested and after searching for the type of reservation required, communicates this information over the telephone to the reservation clerk. The clerk at the window thereupon sells this space to the passenger, embodying this information on a Pullman ticket. This cycle of operations ordinarily entails considerable time and delay, ranging from several minutes upward.

In the system and apparatus of the present invention, the reservation clerk is merely required to play upon a keyboard the date and train number, as well as the type of space requested, whereupon the apparatus automatically locates available space of this character, and reserves the same, and concurrently therewith advises the reservation clerk visually by a series of indicating lights available to him, as to the specific space thus reserved, both as to car number and space number. Such reservation, in accordance with the apparatus of the present invention, is effected in a matter of but a few seconds as compared to the many minutes required by the manual procedures presently in vogue. Moreover, it completely eliminates the necessity for the large diagram room personnel presently required with existing systems.

Apparatus of the present invention for making Pullman passenger and the like reservations, as aforesaid, comprises in its essentials the following components: The method and apparatus for prerecording, on an endless belt of magnetic tape, or on a rotatable drum or disk, of magnetizable medium, the reservation data for a specified period at a specified railway terminal, such as, for example, the total reservations for an ensuing 30 day period at a particular terminal. The prerecording apparatus comprises a series of perforated matrices made of some stiff material, such as thin sheet metal, plastic or the like, capable of being linked together end-to-end, and individually perforated in accordance with the types of space available on the various kinds of Pullman and passenger cars, the perforations being arranged in alinement when the matrices are thus linked. Further, in accordance with the prerecording apparatus of the invention, the thus linked car matrices selected in accordance with the car make-up of a particular train, are fed longitudinally between a light source and a series of photoelectric cells, laterally spaced in accordance with the channels of space available perforations on the matrices, and the information picked up by the photocells thus transferred and recorded as discrete, magnetized areas on a moving magnetic tape, drum, disk or the like, by connecting the photocell outputs through appropriate amplifiers to a correspondingly arranged series of electromagnetic recording units. The rate of feed of the matrices and the magnetic tape or the like is so adjusted that each unit of reservation is recorded on the magnetic tape or equivalent as one cycle of a frequency of 10,000 cycles per second, in connection with which a blank space is provided between each matrix perforation, equal in width to the width of a perforation, so that the blank spaces between pulses as recorded on the magnetic tape will each be equal to the width of a pulse. In addition to the car-reservation matrices, the prerecording also includes additional matrices for recording on magnetic tape drums and the like, such additional data as the starting or reference point, month or months for which the recording is effective, the day of the month, the train numbers for each day, the type of reservation, and a series of time pulses as referred to more in detail below.

The scanning and reserving apparatus of the invention for scanning and interpreting the prerecorded tape and for making reservations thereon in accordance with each passenger's request, comprises, in addition to the prerecorded tape referred to, a mechanical means for feeding the magnetic tape drum disc or the like past a series of stationarily mounted electromagnetic reproducing heads, positioned in alignment, respectively, with the channels of information on the tape drum or the like, and spaced longitudinally from the reproducing heads, a corresponding series of electromagnetic erasure heads, the latter for selectively erasing units of reservation or other recorded information, if desired. The electrical outputs of the recording heads are connected individually to a corresponding series of normally inactive amplifiers, which are energizable in appropriate sequence by a corresponding series of flip-flop circuits, the first of which, in the appropriate sequence of operations, is under control of a start button on a keyboard by a reservation clerk, which, in addition, carries key sequences for setting up a corresponding series of predetermined counters in accordance with any particular reservation required, by month, day, train number and type of reservation. These predetermined counters are in turn interposed, respectively, between the amplifiers associated with the month, day, train number and type of reservation reproducing heads, and the flip-flop circuits which these amplifiers respectively actuate through the counters in question. If desired, the reservation clerk's keyboard may be provided with an additional series of keys for setting up the counters in the car number and space number channels, for preselecting a given car number and space number therein if the passenger so desires. The actual selection of available space, following the preselection of the space desired in the manner aforesaid, is accomplished by means of a coincidence, anti-coincidence circuit interposed between the outputs in multiple of the space number amplifier and the availability amplifier channels. As long as the space number and availability reproducing heads scan over space reservations which have already been taken, the coincidence, anti-coincidence circuit remains inactive, but as these heads scan a space of the character desired which has not been reserved, the coincidence circuit is activated to energize, by means of high-frequency current, an erasure head which erases from the availability channel, the unit of space in question, thus reserving this space per the passenger's request. Meantime, as the apparatus scans the tape, the car number and seat number being progressively scanned are played up before the reservation clerk on a series of indicating lights associated with the counters, so that when the coincidence circuit is actuated to record available space, this space is indicated on the lights in question.

In the event that no space of the character requested is available anywhere on the particular train requested, the apparatus functions in such manner, as explained below, as to light a "no space available" light.

Having thus described the invention in general terms, reference will now be had for a more detailed description thereof, to the accompanying drawings, wherein:

Figure 2 is a view in side elevation of one of the electromagnetic or reproducing heads, while Figure 3 is a corresponding view of one of the electromagnetic erasing heads.

Figure 1:
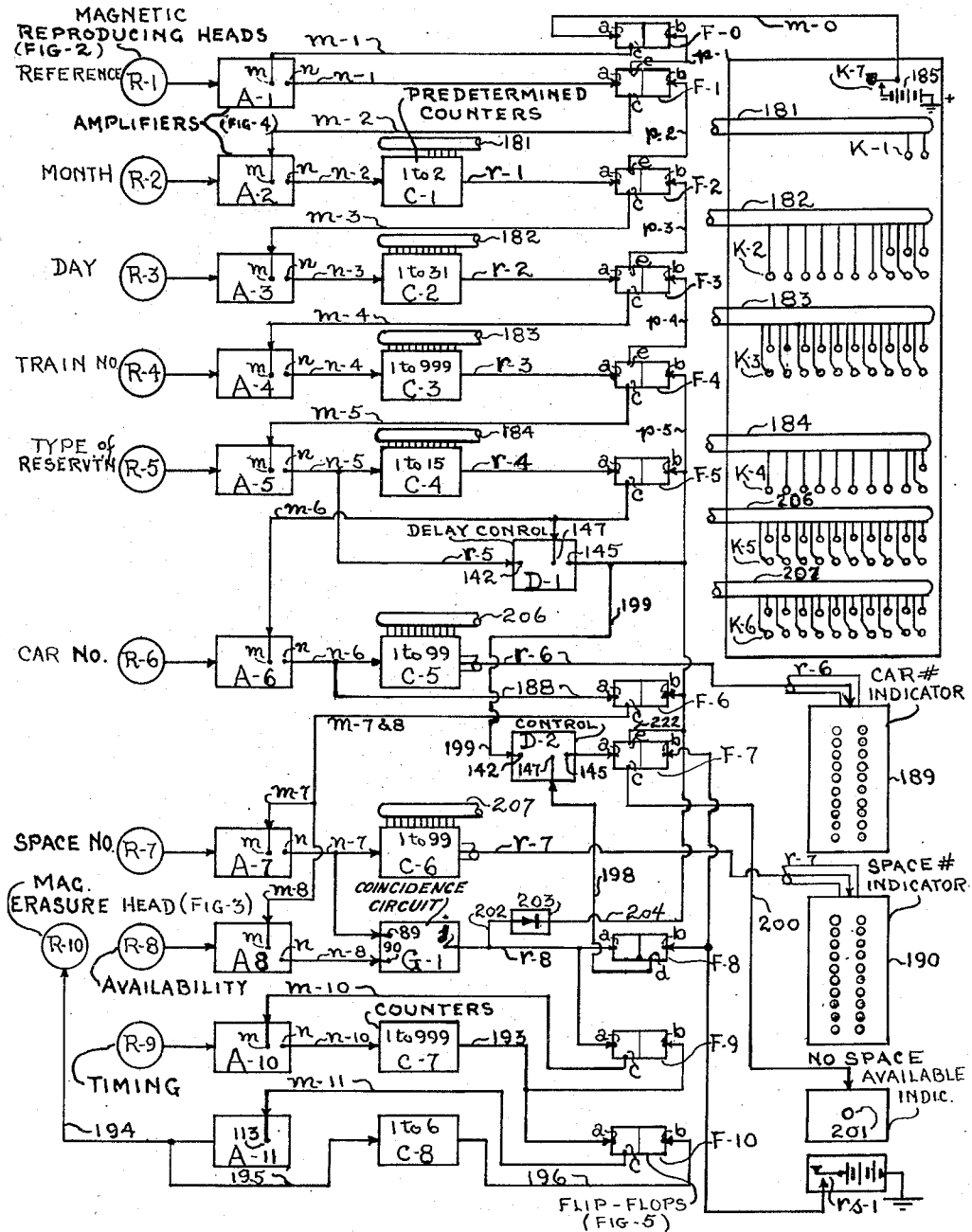
Figure 1 is a schematic layout in diagram form, of the apparatus for scanning, interpreting, indicating and selectively erasing the coded data recorded on the magnetic tape drum disc or the like, the specific form of layout shown in this drawing being adapted for making reservations as aforesaid.
Figure 5:
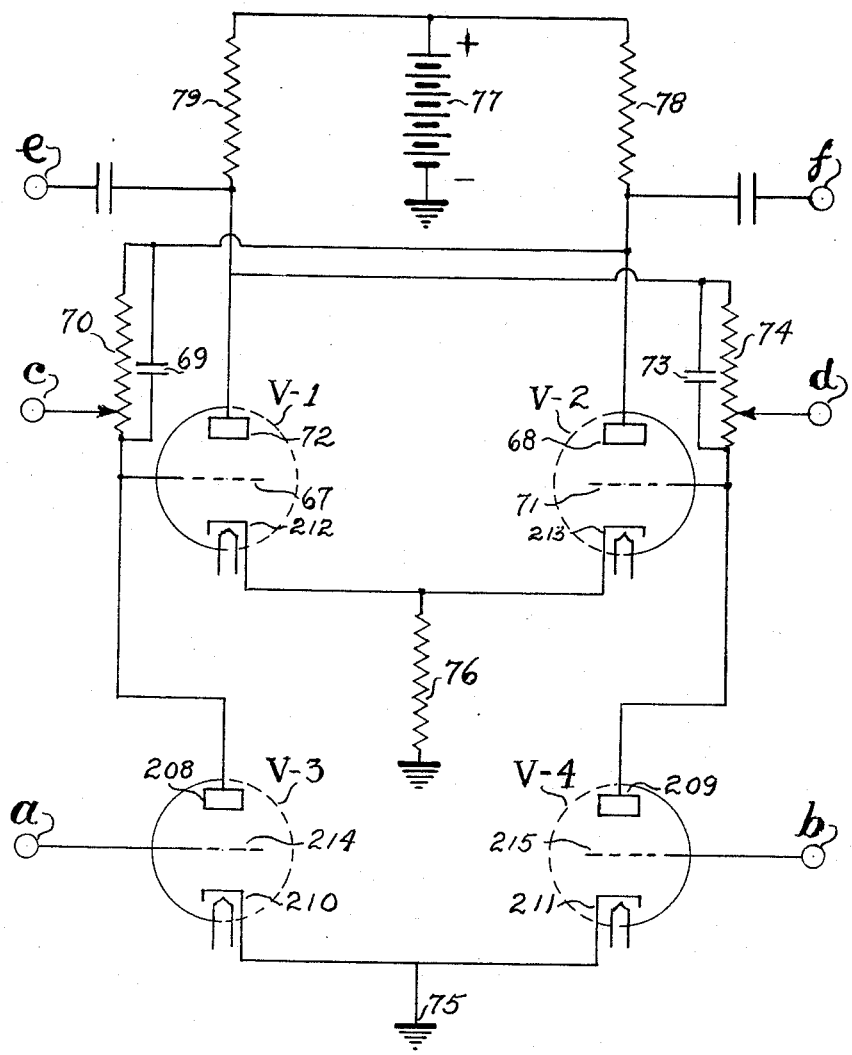
Figure 6:
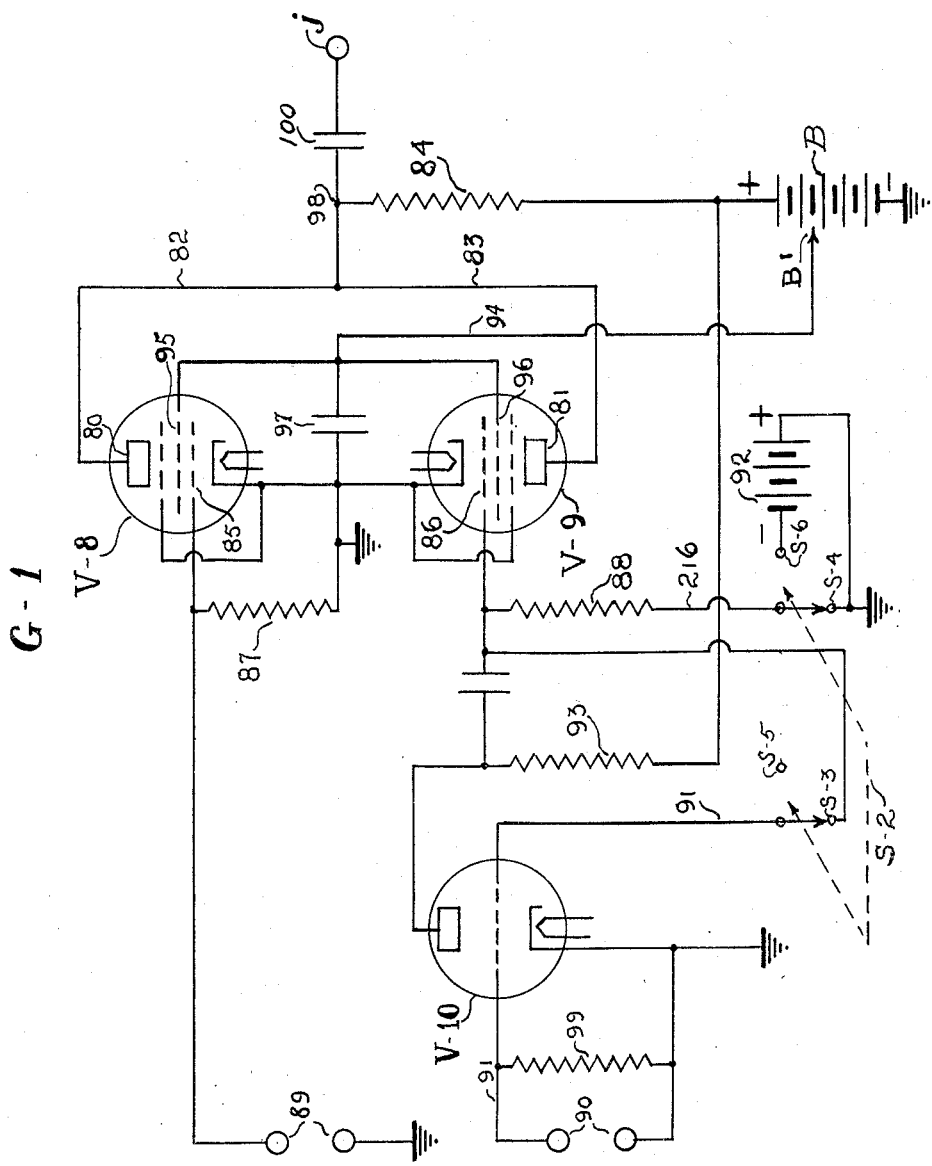
Figure 7:
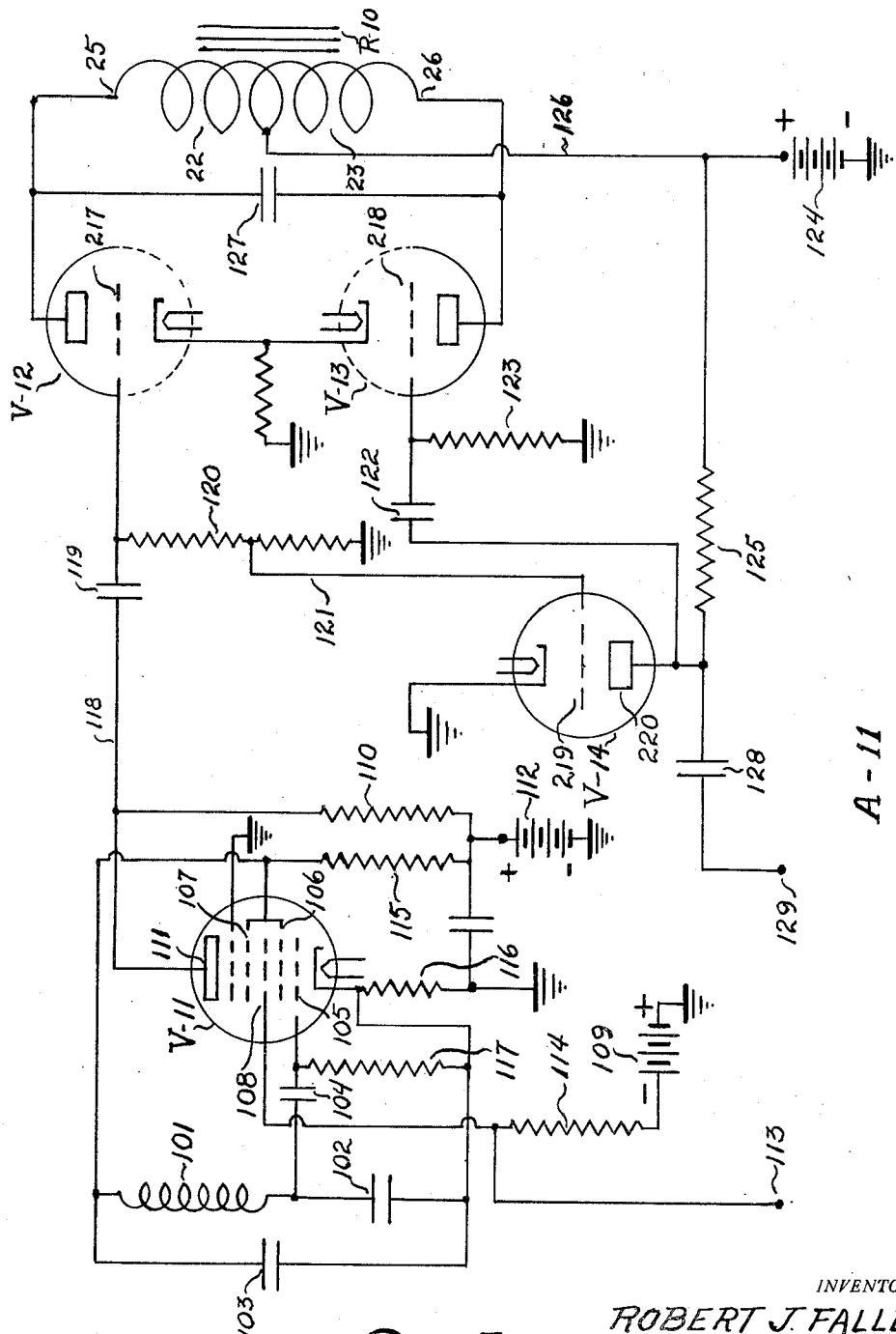
Figure 8:
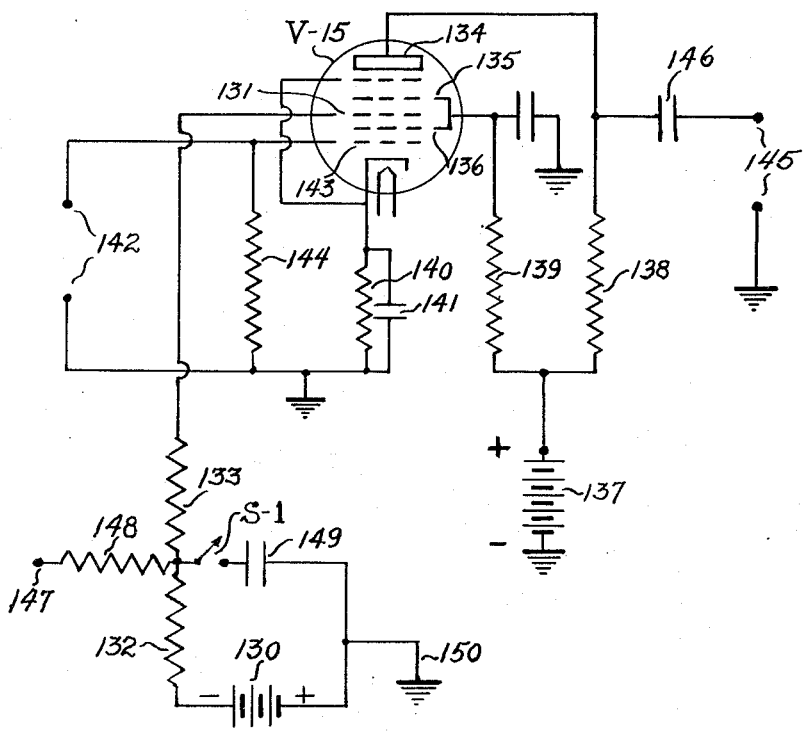
Figure 9:
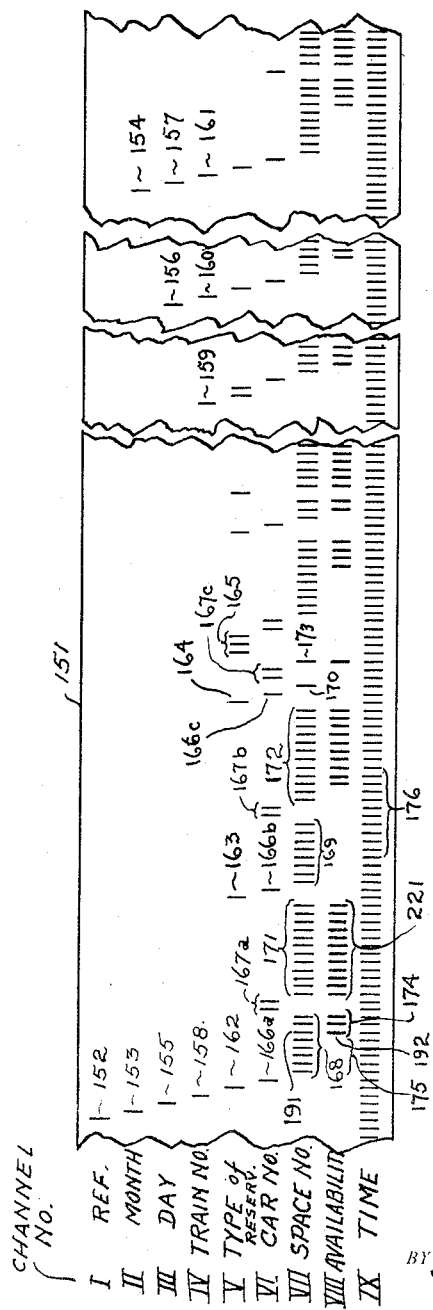
Figure 10:
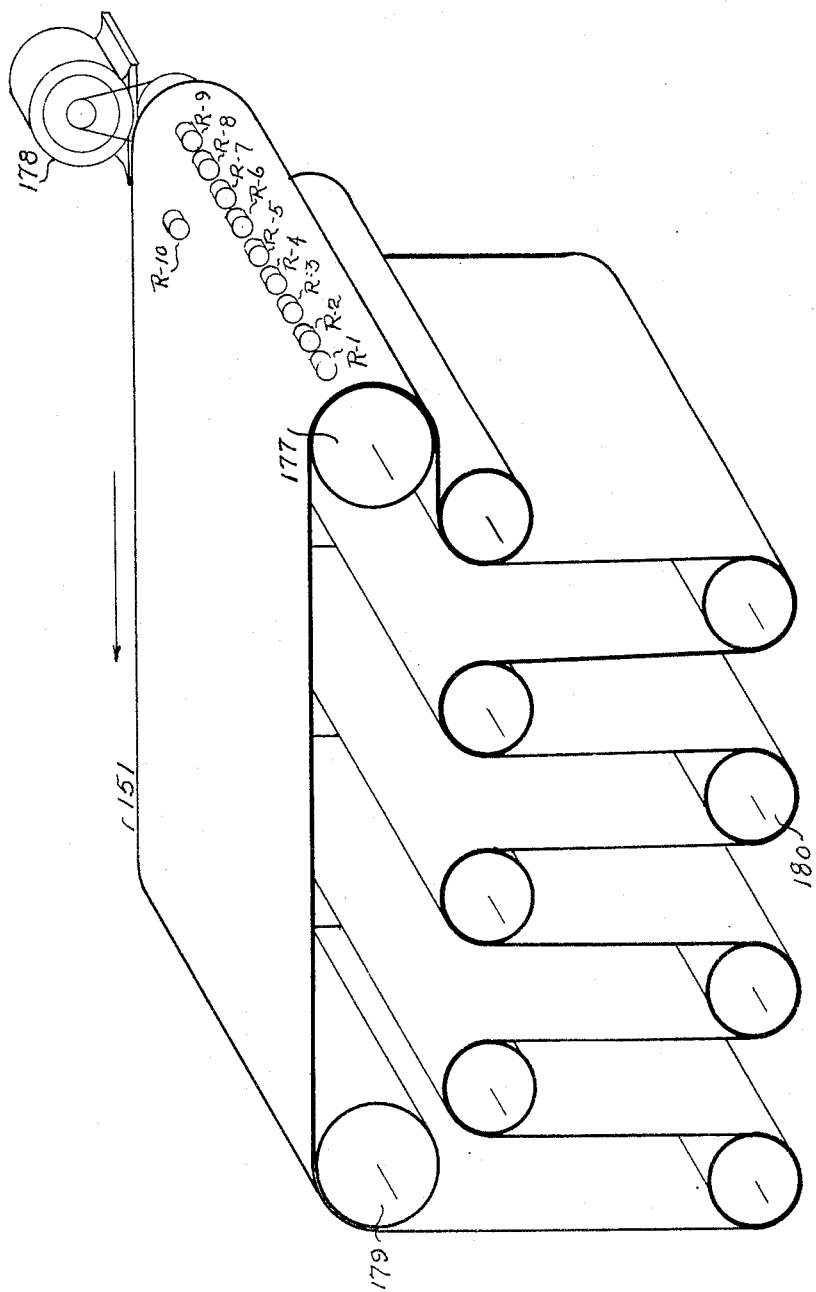
Figure 11:
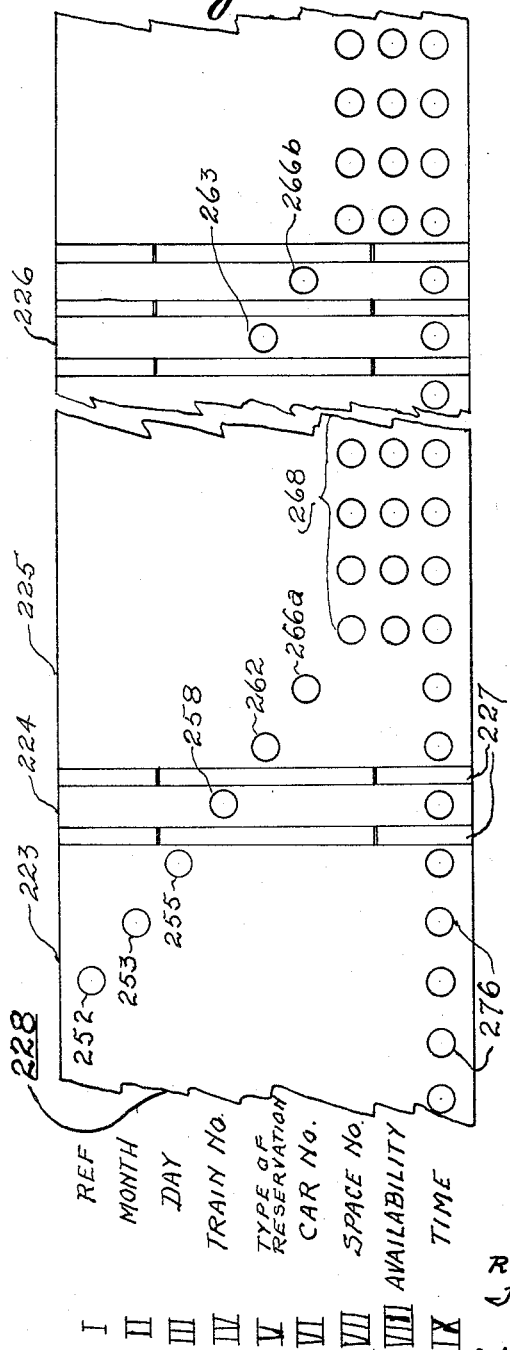

Figure 5 shows the circuit diagram of the flip-flop circuits shown diagrammatically in Fig. 1. Fig. 6 is the circuit diagram of the coincidence, anti-coincidence circuit shown diagrammatically in Fig. 1. Figure 7 shows the circuit diagram of the control amplifier and oscillator shown diagrammatically in Fig. 1. Figure 8 shows the circuit diagrams of the control and delay control circuits, respectively, shown diagrammatically in Fig. 1. Figure 9 illustrates successive sections of the prerecorded magnetic tape employed in accordance with a preferred embodiment of the invention, for actuating the apparatus of Fig. 1; while Figure 10 is a perspective view of the complete prerecorded tape and the tape-driving mechanism therefor, this view also illustrating diagrammatically the relative dispositions of the electromagnetic reproducing and erasing heads shown diagrammatically in Fig. 1. Figure 11 is a plan view of several of the car-reservation matrices in linked assembly, as above referred to.

Figure 12:
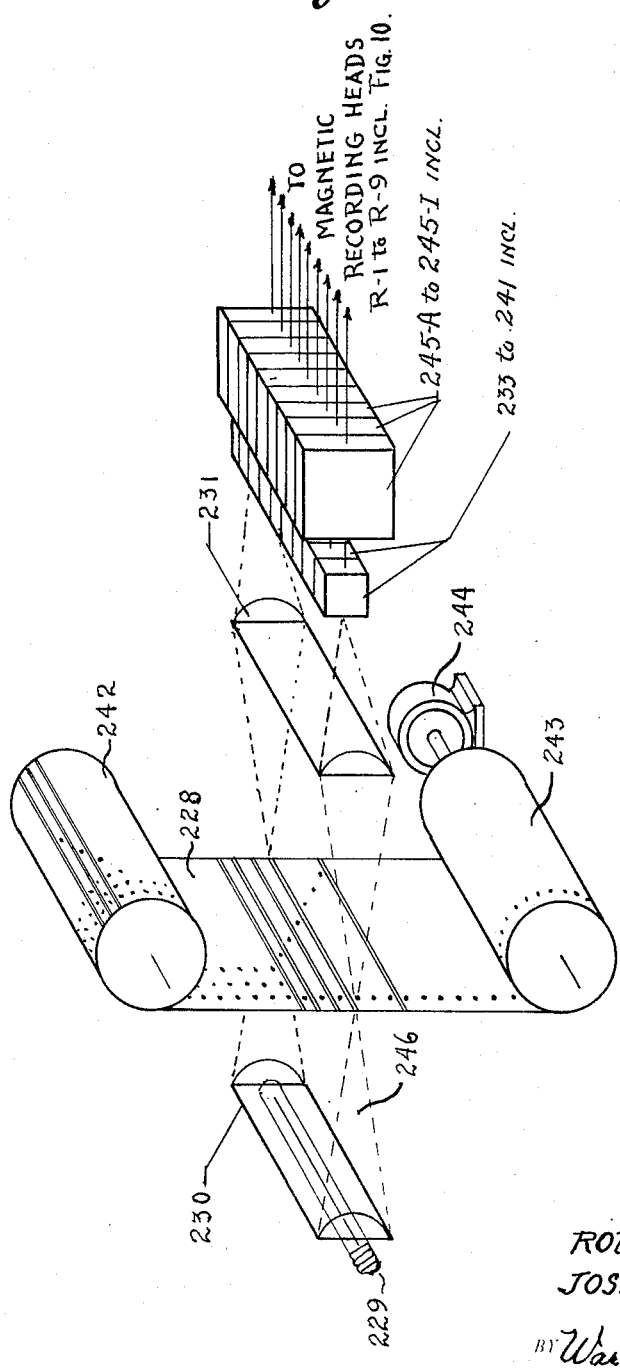

Figure 12 is a diagrammatic view in perspective of the prerecording apparatus for producing the prerecorded magnetic tape of Figs. 9 and 10 in conformity with the car card matrices.

Referring to Fig. 1, the apparatus shown therein comprises a series of electromagnetic reproducing heads R—1 to R—9 inc., all identical with that illustrated in Fig. 2, and an erasure head R—10, similar to that illustrated in Fig. 3. The electrical outputs of the reproducing heads R—1 to R—9 inc., are respectively connected to the inputs of a series of normally inactive amplifiers A—1 to A—8 inclusive, and A—10, each of these amplifiers being identical with that illustrated in Fig. 4, and amplifier A—11 illustrated in Fig. 7. Amplifiers A—1 to A—6 inc., are respectively activated in sequence, in the manner explained below, by a series of flip-flop circuits $F_0$ to $F_5$ inc., each flip-flop circuit having a circuit arrangement identical with that of Fig. 5. In addition, a similar flip-flop circuit $F_6$ activates the amplifiers A—7 and A—8 in multiple. A similar flip-flop circuit $F_9$ activates the amplifier A—10. A similar flip-flop circuit $F_{10}$ activates a control amplifier and oscillator circuit A—11, the circuit of which is shown in Fig. 7. The diagram of Fig. 1 also includes rectifier 203 and a delay-control circuit D—1 and a control circuit D—2, the circuit arrangements of which are shown in Fig. 8, the delay-control circuit D—1 being that of Fig. 8 with switch S—1 closed, while the control circuit is that of Fig. 8 with the switch S—1 open, as explained below. The diagram of Fig. 1 also includes the above mentioned coincidence, anticoincidence circuit G—1, the circuit of which is shown in Fig. 6, the coincidence circuit arrangement being that obtained with switch-arm S—2 operated to contacts S—3, S—4, while the anticoincidence circuit arrangement is that with the switch-arm operated to contacts S—5, S—6.

The diagram of Fig. 1 also includes a series of predetermined counters C—1 to C—6 inc., connected respectively to the outputs of amplifiers A—2 to A—7 inc. The circuit diagram of these predetermined counters is not shown herein, because these counters are per se no part of the present invention and comprise standard equipment available on the market, examples of which are the Potter Dual-Predetermined Electronic Counter, Model 69, manufactured by Potter Electromagnetic Counter Products Company of Flushing, New York; also the RCA Time Interval Counter Type WF 99 B, manufactured by the Radio Corporation of American of Camden, New Jersey, either of which may be employed as the predetermined counter symbols designated as C—1 to C—6 inc. of Fig. 1 herein. These same types of counters may be employed as the counters designated designated as C—7, C—8 of Fig. 1, although the latter need not be of the predetermined type.

The construction and operation of the circuits and apparatus illustrated schematically in Fig. 1, is best explained by first describing the construction and operation of the components thereof, to which attention will now be directed. Reference will accordingly be had to Fig. 2 for an explanation of the construction and operation of the electromagnetic reproducing heads R—1 to R—9 inc., respectively, in Fig. 1. Referring to Fig. 2, the reproducing head comprises a laminated iron core 20 of closed construction, except for a small air gap 21. About the opposite legs of the core 20 are wound a pair of coils 22, 23, which are serially connected, as at 24, with terminals taken out as at 25, 26. The magnetic tape to which the reproducing head responds is shown generally at 27, and comprises a flexible base material 28 of, for example, paper, plastic, nonmagnetic metal strip or the like, to the upper surface of which is uniformly applied a deposit of iron oxide as at 29. As the strip moves longitudinally past the air gap 21, as, for example, in the direction of the arrow 30, magnetized areas of the iron oxide coating 29 produce a changing magnetic flux in gap 21, thereby producing a corresponding alternating current electrical pulse in coils 22, 23, which appears between terminals 25, 26. It should be pointed out that this same type of electromagnetic head illustrated in Fig. 2 may be employed either for recording or reproducing purposes. For recording purposes an electrical pulse is impressed between terminals 25, 26, which correspondingly varies the flux density in the air gap 21, thereby to correspondingly magnetize an area of the iron oxide layer 29.

Referring to Fig. 3, which illustrates an electromagnetic erasing head, the construction thereof is substantially identical with that of the recording and reproducing head of Fig. 2, like elements being similarly designated, the principal difference residing in the fact that the air gap 31 of the erasing head is somewhat wider than corresponding air gap 21 of the recording and reproducing head. Assuming that a certain area of the oxide coating 29 has been magnetized with, for example, one cycle of current at a frequency of 10,000 cycles, this area can be demagnetized by passing it beneath the erasing head gap 31, while at the same time impressing between terminals 25 and 26, a current of substantially higher frequency, of, for example, 60 to 80 kilocycles, assuming the speed of travel of strip 27 for erasing, is the same as that employed for recording. The erasing head is provided with a center tap terminal 32, so that the head may be employed in the output of the push-pull amplifier.

Figure 4:
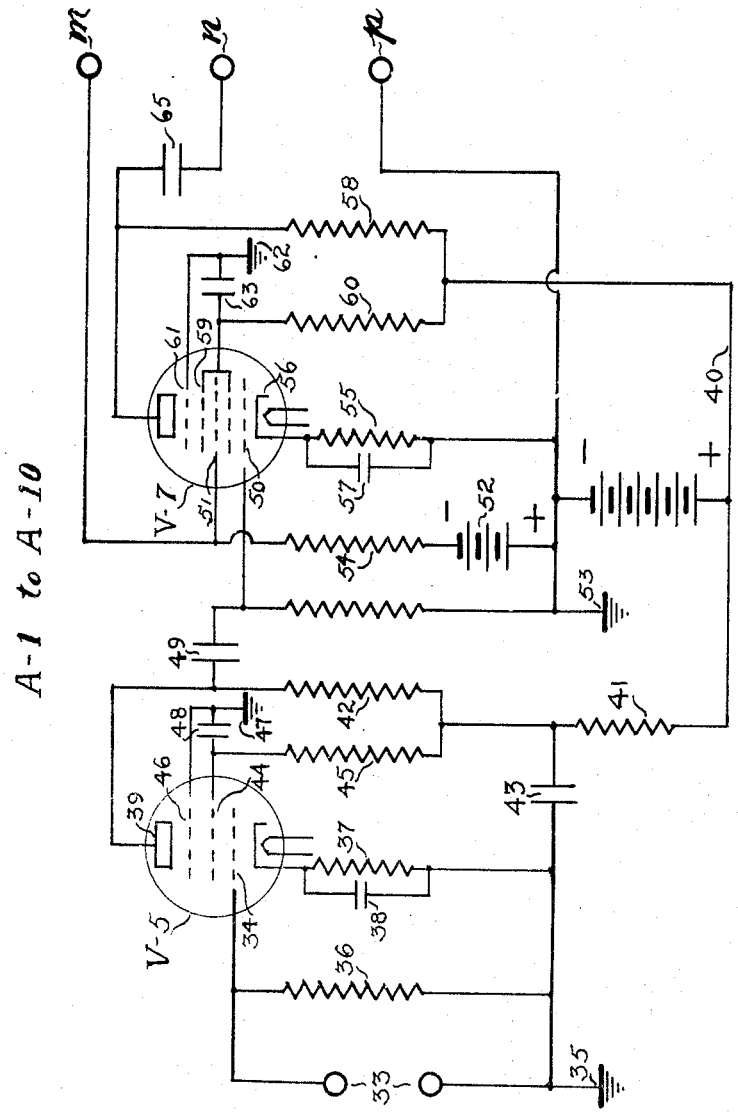
Figure 4 shows the circuit diagram of the amplifier units connected to the electrical outputs of the electromagnetic reproducing heads of Figs. 1 and 2, as shown diagrammatically in Fig. 1.

Referring now to Fig. 4, illustrative of the amplifiers shown diagrammatically in Fig. 1 at A—1 to A—10 inc., this amplifier comprises a high gain amplification stage of conventional design, including a pentode tube V—5, having input terminals 33 extending between the control grid 34 and ground at 35, and bridged by input resistance 36, the grid circuit being self-biased by cathode resistor 37 and by-passing condenser 38. The anode 39 is energized from a source of plate voltage connected over lead 40, and thence through resistors 41 and 42 to the anode. Resistor 41, in conjunction with condenser 43, serves as a de-coupling filter for preventing uncontrolled feedback. The screen grid 44 is energized over lead 40 through a voltage adjusting resistor 45. The suppressor grid 46 is grounded at 47; a condenser 48 connected to the screen grid 44 by-passes the audio currents in the screen grid circuit to ground at 47. The amplifier stage, including pentode V—5, is resistance and capacitively coupled through resistor 42 and condenser 49 to the No. 1 grid 50 of a pentagrid type tube V—7. The injector grid 51 of this tube is normally biased to cutoff by means of a battery 52, the positive side of which is grounded at 53, for normally impressing on grid 51 through resistor 54, a negative biasing voltage such as normally biases the tube to cutoff. Grid 50 is normally biased to the straight portion of the characteristic curve of the tube; it is accomplished by means of the cathode resistor 55, connected between the cathode 56 and ground at 53, this resistor being bridged by a by-passing condenser 57. The anode circuit of the tube is energized from lead 40 over a connection including the plate load resistor 58, the screen grid 59 is energized over lead 40 through voltage adjusting resistor 60. The suppressor grid 61 is grounded at 62; a condenser 63 connected to screen grid 59 by-passes the audio currents in the screen grid circuit to ground at 62. The output of this amplifier is taken off between terminals $n$ and $p$, through blocking condenser 65. A connection 66 extends from the injector grid 51 to a terminal $m$, for purposes of impressing thereon a positive biasing voltage equivalent to the negative voltage normally impressed thereon by battery 52, whereby amplifier stage V—7 is rendered active or conductive, for purposes explained hereinafter in connection with Fig. 1.

Referring to Fig. 5, the flip-flop circuit comprises a pair of triode tubes V—1 and V—2, the grid and cathode electrodes of which are connected in conventional fashion for this type of circuit, the grid 67 of tube V—1 being connected to the anode 68 of tube V—2 through charging condenser 69 shunted by a voltage dividing resistor 70, and grid 71 of tube V—2 being similarly connected to the anode 72 of tube V—1 through a similar charging condenser 73 shunted by a voltage dividing resistor 74. The grids 67 and 71 of tubes V—1 and V—2 extend respectively to the anodes 208 and 209 of a pair of triode voltage divider and amplifier tubes V—3 and V—4, the cathodes 210 and 211 of which are grounded in common at 75. Likewise, the cathodes 212 and 213 of tubes V—1 and V—2 are grounded in common through a cathode biasing resistor 76. The plate circuits of all tubes are energized from "B" battery 77, which is connected to the anodes 68 and 72 of tubes V—2 and V—1 through plate resistors 78, 79. The circuit is so arranged that tube V—1 is normally conducting, while tube V—2 is normally non-conducting, but can be flipped over to render tube V—2 conducting and tube V—1 non-conducting by the application of a positive pulse to terminal $a$, which is connected to the control grid 214 of tube V—3. In order to flop the circuit back to the first condition mentioned, wherein tube V—1 is conducting, a positive pulse is applied to terminal $b$, connected to the control grid 215 of tube V—4. With the circuit in the first or flopped condition in which tube V—1 is normally conducting, a steady, positive potential appears on terminal $c$. This potential will increase in positive value when the circuit is flipped over to render tube V—1 non-conducting. At the same time as the circuit is thus flipped over a positive pulse will appear at terminal $e$, and a negative pulse will appear at terminal $f$. With the circuit in the second or flipped condition in which tube V—2 is normally conducting, a steady positive potential appears on terminal $d$. This potential will increase in positive value when the circuit is flopped back to render tube V—2 non-conducting. At the same time as the circuit is thus flopped back a negative pulse will appear at terminal $e$ and a positive pulse will appear at terminal $f$. The applications of the various voltages and effects described with reference to the terminals $a$ to $f$ inc., will be explained below in connection with a detailed description of Fig. 1.

Referring to Fig. 6, the coincidence circuit shown therein comprises a pair of pentode tubes V—8 and V—9, the anodes 80, 81 of which are connected over leads 82, 83 and thence through a common plate load resistor 84 to a source of plus "B" voltage. The control grids 85, 86 are connected respectively through input resistors 87 and 88 to ground, the latter through contacts S—4 to switch S—2. The resistor 87 is bridged across a pair of input terminals 89, with the switch S—2, in the position shown, resistor 88 is likewise bridged across a pair of input terminals 90 over connections 91 and ground. The screen grids 95, 96 are connected in multiple over a lead 94 to a suitable source of screen voltage plus "B¹" and by-passed to ground through a by-pass condenser 97. Since there is no bias on the control grids 85, 86, tubes V—8 and V—9 are normally conducting, whereby a given plate current normally flows through resistor 84. The simultaneous application of negative voltages to control grids 85 and 86 from terminals 89 and 90, cuts off the plate currents of both tubes V—8 and V—9, causing thereby a large increase in the positive potential at point 98, causing a large positive pulse to appear at terminal $j$, which is connected to point 98 through a blocking condenser 100. If, on the other hand, a negative voltage is impressed on only one pair of terminals 89 or 90, with no voltages being concurrently impressed on the other pair of terminals, then only one of the tubes V—8 or V—9 will be cut off, while the other tube will continue to draw current, causing thereby only a very small change in the voltage at point 98 to be impressed through condenser 100 to terminal $j$. This difference in effect as between negative voltages concurrently impressed on terminals 89 and 90, and on the other hand on only one pair of such terminals, is utilized in the manner described below in connection with Fig. 1.

The circuit of Fig. 6 becomes an anti-coincidence circuit as switch-arm S—2 is operated to contacts S—5, S—6. This change in circuit arrangement interposes the circuit of tube V—10 between terminals 90 and the input resistor 88 to tube V—9, while at the same time connecting the negative terminal of positively grounded battery 92 to the terminal 216 of the input resistor 88. This battery normally biases the control grid 86 of tube V—9 to cutoff. In conjunction with this effect, tube V—10 is a straight amplifier tube which merely reverses the sign of the input voltage impressed on terminals 90. Accordingly, if a negative pulse is impressed on terminals 89 while no pulse is impressed on terminals 90, the anti-coincidence circuit will operate to increase the voltage of the terminal 98. On the other hand, if negative pulses are concurrently impressed on terminals 89 and 90, tube V—8 will become non-conducting while tube V—9 becomes conducting. Since the plate current of one is rising and the plate current of the other tube is falling, no change will appear at point 98 or terminal $j$. Resistors 93 and 99 are the plate and grid resistors of tube V—10 respectively. The application of this anti-coincidence circuit will be described below.

Referring to Fig. 7, the control amplifier and oscillator circuit comprises a tuned circuit consisting of an inductance 101 and condensers 102, 103, this tuned circuit being connected on one side of inductance 101 through a coupling condenser 104 to a control grid 105 of a pentagrid converter tube V—11, and being also connected on the opposite side of the inductance 101 to screen grids 106 and 107, which screen grids are employed as the plate of the oscillator circuit. Injector grid 108 of tube V—11 is biased negatively by the positively grounded battery 109, connected through a resistor 114, so that no current normally flows through resistor 110 connected between the anode 111 of tube V—11 and the plate circuit supply battery 112. The screen grids 106, 107 are energized from the plate voltage source 112 through a voltage adjusting resistor 115. Resistor 116, connected between ground and the cathode, serves as a normal biasing resistor for the injector grid 108. Resistor 117 is used as a biasing resistor for the oscillator circuit of tube V—11. The output of the oscillator circuit is impressed over a conductor 118 and through a coupling condenser 119, onto the input stage of a push-pull amplifier comprising tubes V—12 and V—13, while the control grid 218 of tube V—13 is fed from a phase inverter tube V—14. The grid circuit of tube V—12 includes a potentiometer 120 connected between condenser 119 and ground, with a tap-off at 121 leading to the control grid 219 of the tube phase inverter, V—14, the anode 220 of which is connected through a coupling condenser 122 to the control grid 218 of tube V—13. The grid 217 of amplifier tube V—12 is grounded through potentiometer 120, while the grid 218 of tube V—13 is similarly grounded through a resistor 123. The plate circuits of all tubes are energized from a source of plate voltage 124 connected to the plate of tube V—14 through a plate resistor 125, and connected to the anodes of tubes V—12 and V—13, over a lead 126 extending to the mid-point of coils 22 and 23, respectively, of the electromagnetic erasing head R—10, Fig. 3, the opposite terminals 25 and 26 of coils 22 and 23 being in turn connected to the anodes, respectively, of tubes V—12 and V—13. A condenser 127 is bridged across coils 22 and 23 in series, for tuning the erasing head to the frequency of the oscillator. Tube V—14 is also used as the high frequency biasing amplifier in the process of recording data on magnetic tape or the like, through a blocking condenser 128 extending to terminal 129, to which the recording head, Fig. 2, is connected to ground by connecting one coil terminal 26 thereof to terminal 129, the opposite terminal 25 being grounded.

Referring to the circuit of Fig. 8, this circuit comprises a delay control circuit D—1, Fig. 1, with switch S—1 closed. The circuit comprises a pentagrid converter tube V—15, which is normally biased to cutoff by means of positively grounded battery 130 connected to the injector grid 131 of the tube V—15 through resistors 132, 133. The anode 134 and the screen grids 135 and 136 are energized by a source of plate voltage 137, the anode through a plate resistor 138 and the screen grids through a voltage adjusting resistor 139. The cathode is biased through a grounded resistor 140 shunted by a by-passing condenser 141. A signal is impressed on the tube from input terminals 142 connected between the control grid 143 and ground, and bridged by input resistor 144. The output is taken off from terminals 145, one terminal being grounded and the other connected to the anode 134 through a blocking condenser 146. As stated, tube V—15 is normally biased to cutoff by battery 130, so that a signal applied to the input terminals 142 is not transmitted to the output terminals 145, unless a positive voltage has been applied to terminal 147. The application of such a positive voltage to terminal 147 does not render the tube immediately conductive, due to the time constant of the series resistor 148 and condenser 149 connected between the input terminal 147 and ground at 150 through switch S—1. This time delay circuit causes the positive voltage impressed on terminal 147 to gradually build up on grid 131 until it finally overcomes the negative voltage applied thereto from battery 130, thereby rendering the tube conductive to transmit the signal after a preselected interval.

With the switch S—1, Fig. 8, open, the circuit thereof acts as a straight control circuit. As before, the tube is normally biased to cutoff by the negative voltage applied to grid 131 from battery 130. However, upon the application of a positive voltage to terminal 147, sufficient in magnitude to overcome the negative voltage of battery 130, the tube is immediately rendered conductive to transmit and amplify a signal impressed on input terminals 142.

Having thus described the various components of the apparatus shown schematically in Fig. 1, reference will now be had to Figs. 1, 9 and 10 for a detailed description of the overall operation of the apparatus. Figure 9 illustrates graphically successive sections of the magnetic tape 151 on which the coded reservation data for available passenger reservations extended over a substantial period of time, for example a 30-day interval, having prerecorded in the manner above referred to and described more in detail hereinafter. The necessary channels of information, which are disposed in spaced parallel relation on the magnetic tape 151 comprise an initial magnetized area 152 which serves as the reference point in channel I, the channel II of information for indicating the month in which the reservation is desired as indicated by the magnetized areas 153 and 154, since for a passage reservation record covering a 30-day interval, a particular reservation may occur in either of two successive months. The next channel III of information comprises the day on which the reservation is desired as indicated by the magnetized areas 155, 156, 157 each representing a different day of the reservation schedule. The next channel IV of information comprises the train number as indicated for example by the magnetized area 158 corresponding to the first train on the day represented by the magnetized area 155, and by the successive magnetized areas 159 representing for example the second train on the day in question, and so on for successive trains. In the same way area 160 would represent the first train on the day corresponding to area 156, and similarly area 161 would represent the first train on the day corresponding to area 157, and so on. The next channel V of information comprises the types of reservation available on a particular train. The various types of reservation available on the trains can of course be given arbitrary code designations, for example one magnetized area such as 162 can be employed to indicate a lower berth, while two successive magnetized areas such as 162 and 163 can be employed to indicate an upper berth, three successive magnetized areas 162, 163, 164 can des- ignate a drawing room, four successive areas a compartment, five a reserved coach, and six, such as magnetized areas 162 and 165 inclusive, can designate a roomette, seven a double room, eight a single bedroom, nine a parlor car, and so on. The next channel VI of information comprises the car number. Thus area 166a would designate car number 1 on the train corresponding to area 158, and similarly the magnetized areas 166a and 167a would designate car number 3 on that train, and so on for the successive cars. It will be noted that the magnetized area corresponding to a particular car number such as 166a, may appear at successive points on the car number channel VI of information. The reason for this is that any given car may have several types of passenger space available, such for example as a certain number of lower berths, a certain number of upper berths, a certain number of single bedrooms, and so forth. This becomes clear from a consideration of the type of reservation channel V in conjunction with the space number channel, VII. Thus, referring to the particular car designated by the magnetized area 166a, in conjunction with the type of reservation V channel and the space number channel VII, it will be observed that this car has eight units of reservation of type number 1, as indicated by the magnetized area 162, namely, eight lower berths indicated by the eight successive magnetized areas 168. This same car has also eight units of reservation of type 2, namely, eight upper berths as indicated by the successive magnetized areas 169, these units of reservation 169 appearing under the type 2 reservation of the type of reservation channel V, as indicated by the successive magnetized areas 162 and 163. The same car number 1, has one unit of reservation type number 3, as indicated by the magnetized area 170 appearing under the third type of reservation as indicated by the successive magnetized areas 162, 163, 164. In accordance with the same coded sequence, car number 3 would have twelve lower berths, as indicated by the successive magnetized areas 171 under the type 1 reservation for that car, and would also have twelve upper berths as indicated by the magnetized areas 172 allocated under the type 2 reservation for that car, and finally would have one drawing-room as designated at 173 under the type 3 reservation for that car, these various types of reservation on car number 3 appearing under the successive car area designations for example, number 3 is indicated at 167a, 167b and 167c. The next channel VIII of information comprises the availability channel, in which channel appears the space available for reservation of each particular type and in each particular car of each train, and of successive trains. Thus the successive magnetized areas 174 in the availability channel VIII in the car number 1 indicate that three lower berths are available for reservation car number 1 (and the successive magnetized areas 221 in the availability channel VIII in car number 3 indicate twelve lower berths are available for reservation in car number 3). The blank space corresponding to area 175, indicates that the other five lower berths in this car have already been reserved and the magnetized areas therefor erased in the manner above described. The final channel IX of information comprises a series of timing pulses corresponding to the equally spaced magnetized areas 176 extending the entire length of the tape. These timing magnetized areas represent the above mentioned lines of information, in coincidence with one or the other of which the various magnetized areas above described are disposed, such as the reference pulse, the month, day, train and type of reservation, etc., pulses.

Referring now to Fig. 10, the thus prerecorded magnetic tape 151 is arranged in the form of an endless belt as shown and is fed successively over a driven roll 177, driven by motor 178, and also over successive idler rolls, as at 179, 180, etc. Motor 178 is continuously energized to continuously drive the magnetic belt 151 past the aforesaid series of stationarily mounted reproducing heads R—1 to R—9, inclusive, these reproducing heads being laterally spaced from one another across the width of belt 151 in alinement respectively with the channels of information I to IX inclusive, recorded thereon, as in Fig. 9. Thus each reproducing head scans a particular channel of information. Stationarily mounted in alinement with the reproducing head R—8, and displaced therefrom in the direction of strip travel, by 1000 units of the timing pulses 176, Fig. 9, is an erasure head R—10, for erasing units of reservation from the availability channel VIII, Fig. 9, as these units are successively reserved.

Referring to Fig. 11, which illustrates parts of the interlinked car card matrices employed for the prerecording of the magnetic tape shown in Fig. 9, these linked matrices are perforated as shown in accordance with the coding designating the reference, month, day, train, etc. information desired. The first car card 223 bearing perforations 252, 253, 255 and 276, being linked by a hinge 227 to car card 224 bearing perforations 258 and 276, thence linked to car cards 225 and 226, etc. would produce the magnetized areas on the tape as shown in Fig. 9. Light falling through perforations 252, 253, etc. would respectively magnetize areas 152 and 153, etc. of aforesaid magnetic tape. Thus any coded Pullman reservation information may be assembled and transferred from car card matrices to magnetized areas of the magnetic tape, disc, or the like.

Fig. 12 shows diagrammatically the method of transferring information perforated in the assembled car card matrices of Fig. 11 to the magnetic tape, disc or the like, of Fig. 9. It consists of a suitable light source 229, optical systems 230 and 231, car card matrices storage roll 242, take-up roller 243 driven by a motor 244, photo electric cells 233 to 241 inclusive connected to amplifiers 245A to 245I inclusive respectively, thence to the magnetic recording heads R—1 to R—9 inclusive of Fig. 10. Thus as the series of perforated car card matrices are caused to pass through the light beam 246, each perforation will transmit light to the photo cell in its respective channel; when the output signals or voltages of the photo cells are suitably amplified and fed to recording heads R—1 to R—9 of Fig. 10, they in turn magnetize the areas shown on Fig. 9.

Referring now to Fig. 1, and bearing in mind that the reproducing heads R—1 to R—9 inclusive, and the erasure head R—10, are positioned in relation to the moving magnetized tape in the manner illustrated in Fig. 10, the operation of the Fig. 1 circuit is as follows: When a passenger requests a particular type of reservation on a particular train on a specified day and month, the reservation clerk plays up this information on the keyboards K—1 to K—4, inclusive. The individual keys of these keyboards are wired over cables 181 to 184 inclusive, to the predetermined counters C—1 to C—4, inclusive, respectively. Thus these counters are set respectively in accordance with the month, day, train number and type of reservation that the passenger has requested. Having set up this information on the keyboards and thence on the counters in the manner aforesaid, the reservation clerk now depresses the starting key K—7, which applies a negative pulse from battery 185 over connection $m_0$ to terminal $a$, Fig. 5, of the flip-flop circuit $F_0$. This causes the flip-flop circuit to flip in the manner explained in connection with Fig. 5, whereby the left side thereof, Fig. 1, now becomes non-conducting while the right side thereof becomes conducting, corresponding to the deactivation of tube V—1 and the activation of tube V—2, in Fig. 5. Tube V—2 now being activated, a higher positive voltage appears on the terminal $c$, which is applied over lead $m$—1 to the terminal $m$, Figs. 1 and 4, of the amplifier A—1. This amplifier is thus rendered conducting in the manner described in connection with Fig. 4, whereby as the reference magnetized area 152, Fig. 9, passes under the reproducing head R—1, a pulse is transmitted through the amplifier A—1 and over the output terminal $n$ therefrom, and over lead $n$—1 to terminal $a$ of the next flip-flop circuit F—1, thereby to flip the same and render tube V—1 thereof non-conducting and tube V—2 thereof concurrently conducting. The flipping of this flip-flop circuit F—1 in turn transmits a pulse from its $e$ terminal over lead $p$—1 to terminal $b$ of flip-flop circuit F—0, thereby flopping or restoring flip-flop circuit F—0 to its initial condition, in which tube V—2 is non-conducting, and tube V—1 conducting. At the same time flip-flop circuit F—1 applies a higher positive voltage from its $c$ terminal over lead $m$—2 to the $m$ terminal of the next amplifier A—2 thereby to activate this amplifier. Meantime, it should be pointed out that when flip-flop circuit F—0 is restored to its initial condition in the manner aforesaid, it deactivates amplifier A—1. Amplifier A—2 now being rendered active in the manner aforesaid, the reproducer head R—2 responds to magnetized areas of the month channel II, Fig. 9, to transmit pulses recorded thereon through amplifier A—2 to the predetermined counter C—1. When the number of pulses have reached the predetermined count established thereupon by the keyboard K—1, this counter will transmit a pulse over lead $r$—1 to the $a$ terminal of the next flip-flop circuit F—2, which thereupon flips, and transmits from its $e$ terminal and over lead $p$—2 a pulse to the $b$ terminal of the preceding flip-flop circuit F—1, thereby to flop the latter and deactivate the preceding amplifier A—2. At the same time there appears at the $c$ terminal of flip-flop circuit F—2 a higher positive voltage which is applied over lead $m$—3 to the $m$ terminal of the A—3 amplifier, thereby to activate the same. In this way pulses picked up by the reproducer head R—3 from the day channel III, Fig. 9, are transmitted through amplifier A—3 to the predetermined counter C—2, which has been set up by the keyboard K—2 in conformity with the particular day on which a reservation has been requested. When this day has been counted by counter C—2 it transmits a pulse over lead $r$—2 to the $a$ terminal of the next flip-flop circuit F—3 to actuate the same in the same manner and to the same ends above described with reference to flip-flop F—2, i. e. to flop the flip-flop circuit F—2 and thus deactivate amplifier A—3 while at the same time activating the next amplifier A—4. The reproducer head R—4 thereupon responds to the train number pulses, channel IV to count on counter C—3 the particular train requested as preset by keyboard K—4. When the train number has thus been counted flip-flop circuit F—4 is actuated in the same manner as those aforesaid to cause flip-flop circuit F—3 to flop and deactivate amplifier A—4 while activating the next amplifier A—5. Amplifier A—5 now being rendered active in the manner aforesaid, the reproducer head R—5 responds to magnetized areas of the type of reservation channel V, Fig. 9, to transmit pulses recorded thereon through amplifier A—5 to the predetermined counter C—4 and also to the delay-control circuit D—1, the latter over connection $r$—5 extending from the $n$ terminal of the amplifier A—5 to the input terminals 142, Fig. 8 of the delay-control circuit D—1. The operation of the delay-control circuit will be explained below. Meantime, however, when the number of pulses passing to counter C—4 have reached the predetermined count established thereupon by the keyboard K—4, this counter will transmit a pulse over lead $r$—4 to the $a$ terminal of the next flip-flop circuit F—5, which thereupon flips and activates the car number amplifier A—6 over lead $m$—6 and also activates the delay-control circuit D—1 over connection 187 extending to the time delay terminal 147 of the delay-control circuit D—1, Figs. 1 and 8. Thus the car number amplifier A—6 is not activated until the desired type of reservation has been found. Activation of the car number amplifier A—6 causes the pulse picked up by the car number reproducer head R—6 from the car number channel VI to be transmitted over conductor $n$—6 to the counter C—5, and also to be transmitted over lead 188 to the $a$ terminal of the flip-flop circuit F—6; which thereupon flips to apply a higher positive voltage from its $c$ terminal over lead $m$—7, 8 and thence in multiple over leads $m$—7 and $m$—8 to the space number and availability amplifiers A—7, A—8 respectively, the counter C—5 transmits its count over lead $r$—6 to the car number counter indicating panel 189, so that the reservation clerk can see the particular car in which space is made available as explained below. Meantime, while the pulses are thus being transmitted over leads $n$—7 and $n$—8 to the coincidence circuits, pulses from amplifier A—7 are also being transmitted to the space number counter C—6 which in turn transmits the space number count over lead $r$—7 to the space number indicator 190, which plays up the space number before the reservation clerk. Reverting now to the coincidence circuit G—1, and to the space number and availability channels VII and VIII of Fig. 9, when the space number and availability reproducer heads R—7 and R—8 scan concurrently over magnetized areas in channels VII and VIII respectively, as at 191 and 192, Fig. 9, the coincidence circuit G—1 transmits a pulse, in the manner explained in connection with the description of Fig. 6, to its output terminal $j$ which in turn is transmitted over connection R—8 to the $a$ terminal of flip-flop circuit F—8, and in multiple therewith to the $a$ terminal of flip-flop circuit F—9, and over lead 202 to a rectifier 203 whose function will be explained later. The transmittal of the pulses aforesaid to flip-flop circuit F—9 flips the same whereby a higher positive voltage appears at its $c$ terminal which is applied over lead $m$—10 to the $m$ terminal of the A—10 timing amplifier thereby to activate the same. Activation of the timing amplifier A—10 causes pulses picked up by the reproducer R—9 from the timing channel IX, Fig. 9, to be transmitted to the counter C—7, set to count to 1,000, whereupon the counter C—7 transmits a pulse over lead 193 to the $a$ terminal of flip-flop circuit F—10 thereby to flip the same, whereupon a higher positive voltage appears at the $c$ terminal thereof, which is applied over lead $m$—11 to the activating terminal 113, Fig. 7, of the control amplifier and oscillator circuit A—11. The output of the control amplifier and oscillator is fed over connection 194 to the erasure head R—10, thereby to erase from the availability channel VIII, Fig. 9, the magnetized area 192, thereby to reserve this space per the passenger's request. As explained above the control amplifier and oscillator A—11 has a much higher frequency of oscillation than that corresponding to the timing pulses, for example 60 kilocycles (60 kc. p. s.) vs. 10 kilocycles (10 kc. p. s.) so that as the magnetized area 192 to be erased passes under the erasure head it is subjected to repeated cycles of the erasure current. To set the limit on the erasing cycles to which it is thus subjected and to assure that only the magnetized area 192 will thus be erased, the output of the control oscillator is concurrently applied over lead 195 to a counter C—8, set to count 6 cycles, whereupon it transmits a pulse over lead 196 to the $b$ terminal of the flip-flop circuit F—10 thereby to restore this circuit to its initial condition, and thus remove the higher positive voltage from the $m$—11 lead to deactivate the control amplifier and oscillator A—11.

In order to prevent the coincident circuit G—1 from searching for additional space, once an available space has been located, and to prevent the counters C—5 and C—6 from counting and indicating on the car number indicator and space number indicator panels erroneous car numbers and space numbers, while the circuits for activating the erasing head are being energized, the amplifiers A—5 to A—8 inc. corresponding to the type of reservation, car number, space number and availability amplifiers, must be immediately deactivated. This is effected by transmission of the pulse from terminal $j$ over conductor 202, thence through a rectifier 203 (the latter for the purpose explained below), thence over lead 204 to the $b$ terminals of the F—4 to F—6 inc. flip-flop circuits, which are thus restored to their initial conditions, thereby deactivating, over leads $m$—5, $m$—6, $m$—7 and $m$—8, the amplifiers A—5 to A—8 inc. aforesaid.

Rectifier 203 also serves as a one-way device and is required for the purpose of preventing a pulse from delay control D—1 originating at point 145 from producing a false operation of flip-flop circuit F—9.

As was mentioned above, the delay control circuit D—1 is activated by operation of the flip-flop circuit F—5. The purpose of this delay control circuit D—1 in conjunction with the control circuit D—2 is to deactivate amplifiers A—5 to A—8 inclusive, and to indicate on the "no space available" indicating lamp 201, if no space of the type desired is available on the particular train for which space has been requested. This indication is accomplished as follows: The control circuit D—2 is normally energized over lead 198, extending from the $d$ terminal of flip-flop circuit F—8 to the terminal 147 of the control circuit D—2, Fig. 8. If no space of the type requested is available on the train, the next type of reservation pulse appearing on channel V (Fig. 9) will be transmitted through the type of reservation amplifier A—5 and applied over lead R—5 to the input terminal 142 of the already activated delay control circuit D—1, and thus transmitted to its output terminal 145 and transmitted thence over lead 199 to input terminal 142 of the normally active control circuit D—2, and transmitted thence to its output terminal 145 to the $a$ terminal of the flip-flop circuit F—7, which thereupon flips and applies a pulse from its $e$ terminal over lead 222 to the $b$ terminals of flip-flops F—4, F—5 and F—6 to deactivate amplifiers A—5 to A—8 inclusive; F—7 also applies a higher positive potential from its $c$ lead over conductor 200 to light the "no space available" indicating light 201.

If on the other hand, space is available to operate the coincident circuit in the manner described by transmitting a pulse from its output terminal $j$ and thus operate the flip-flop circuit F—9 to erase the selected reservation in the manner aforesaid, this pulse transmitted from terminal $j$ is also transmitted over lead R—8 to the $a$ terminal of the flip-flop circuit F—8, thereby to flip the same and thus deactivate the control circuit D—2, thus to prevent any erroneous lighting of the "no space available" indicating light.

If a passenger desires a specific space on a car, or desires space in a particular car, or, finally, desires a particular space on a particular car, any of these conditions can be met with the apparatus by providing additional keyboards K—5 and K—6, which are wired over cables 206 and 207 to predetermined counters, as at C—5 and C—6, in the car number and space number channels. Thus, if the passenger desires a particular space on a car, keyboard K—6 can be played up in accordance with the particular space requested, and this space would be counted out on counter C—6 for transmitting a pulse to the coincident circuit, in which event, however, the counter would have to be interposed between the space amplifier A—7 and the connection $n$—7 to the coincident circuit. The same remarks apply to selection of a particular car, in which event the car desired would be played up on keyboard K—5 and the counter C—5 interposed between the amplifier A—6 and the flip flop circuit F—6. With these modifications also a particular space on a particular car would be translated by properly playing up the car and space required on keyboards K—5 and K—6.

After any of the aforesaid kinds of searches have been made, all flip-flop circuits and amplifiers hereinbefore mentioned will have been returned to their normal or quiescent condition as above described by the action of flip-flop F—7 if no seat was found available, or the action of the pulse from output $j$ of coincidence circuit G—1 over lead 202 if a seat was found available, or the action of reset switch $rs$—1 which is manually operated by the clerk whenever he wishes to put out the "no space available" indicating light. Counters C—5 and C—6 are restored to their original condition by their component reset buttons which are manually operated by the clerk.

What is claimed as new and desired to be secured by Letters Patent is:

1. In an apparatus of the class described: a magnetic surface having channels of information recorded thereon in the form of spaced magnetized areas; means for displacing said surface past a series of magnetic reproducing heads spaced in conformity with said channels respectively; a series of normally inactive amplifiers having inputs individual to the electrical outputs of said heads respectively, each said amplifier having a triggering connection for activating the same in response to a potential applied thereto; a series of electronic flip-flop circuits having normally active inputs individual respectively to said amplifier outputs, each said flip-flop circuit having a normally inactive output connected to the triggering connection of the next adjacent amplifier of said series, and certain of said flip-flop circuits also having a triggering connection therefrom to the next preceding flip-flop circuit of said series; means for triggering the first amplifier of said series including an additional flip-flop circuit having a normally inactive input and means for transmitting a triggering pulse thereto, and having a normally inactive output connected to the triggering connection of said first amplifier, whereby, upon activation of said first amplifier the first said reproducing head activates the second amplifier of said series in response to information recorded on a first channel of said magnetic surface, and whereby said succeeding heads and triggering circuits and amplifiers of said series are actuated seriatum by the remaining channels of information of said surface.

2. An apparatus according to claim 1, including predetermined counters interposed respectively between certain of said amplifier outputs and the flip-flop circuits connected thereto, together with means for individually setting said counters in accordance with selected counts corresponding to a reservation desired.

3. An apparatus according to claim 1 wherein indicating counters are respectively connected to the outputs of certain of said amplifiers, and indicators are respectively connected to said indicating counters, for indicating the counts of magnetized areas recorded on the corresponding channels of information upon energization of the amplifiers connected to said counters respectively.

4. An apparatus according to claim 1 wherein predetermined counters are interposed respectively between certain of said amplifier outputs and the flip-flop circuits respectively connected thereto, together with means for individually setting said counters in accordance with selected counts; and wherein indicating counters are respectively connected to the outputs of certain other of said amplifiers for indicating the counts of magnetized areas recorded on the corresponding channels of information, upon energization of the amplifiers connected to said counters respectively.

5. An apparatus according to claim 1 wherein the final flip-flop of said series has its normally inactive output connected in multiple to the triggering circuits of an additional pair of normally inactive amplifiers, the inputs to which are respectively connected to an additional pair of reproducing heads, and the outputs from which are connected to a coincidence circuit, whereby said coincidence circuit is activated upon concurrent passage of said reproducing heads over magnetized areas; means including an erasure head, responsive to actuation of said coincidence circuit, for erasing one of said magnetized areas; and means including said indicating counters for indicating, according to code number, the magnetized area so erased.

6. An apparatus according to claim 1 wherein predetermined counters are interposed between certain of said amplifier outputs and the flip-flop circuits respectively connected thereto, together with means for individually setting said counters in accordance with selected counts corresponding to a reservation desired; and wherein indicating counters are respectively connected to the outputs of certain other of said amplifiers for indicating the counts of magnetized areas recorded on the corresponding amplifiers respectively; and wherein one flip-flop circuit of said series has its normally inactive output connected in multiple to the triggering circuits of an additional pair of normally inactive pair of amplifiers, the inputs to which are respectively connected to an additional pair of reproducing heads, and the outputs from which are connected to a coincidence circuit, whereby said coincidence circuit is activated upon concurrent passage of said additional reproducing heads over magnetized areas; means including an erasure head responsive to actuation of said coincidence circuit for erasing one of said magnetized areas; and means including said indicating counters for indicating, according to code number, the magnetized area so erased.

7. An apparatus for reserving accommodations on trains, planes and the like, comprising: a magnetizable surface on which said reservations are recorded as spaced, magnetized areas in channels of information, one said channel recording successive days, other such channels recording for each successive day and according to code number designations, the available trains, planes and the like, and available types of accommodations for each, two other such channels recording in transversely aligned relation for each day and for each train, plane and the like, and each type of accommodation thereof, the number of available units of each type of accommodation; means for displacing said surface past a series of magnetic reproducing heads spaced in conformity with said channels respectively; a series of normally inactive amplifiers having inputs individual to the electrical outputs of said heads respectively, each said amplifier having a triggering connection for activating the same in response to a potential applied thereto; a series of electronic flip-flop circuits having normally active inputs individual respectively to said amplifier outputs, each said flip-flop circuit having a normally inactive output and a triggering connection therefrom to the next adjacent amplifier of said series, and certain of said amplifiers also having a triggering connection therefrom to the next preceding flip-flop circuit of said series; means for triggering the first amplifier of said series including an additional flip-flop circuit having a normally inactive input and means for transmitting a triggering pulse thereto, and having a normally inactive output and a triggering connection therefrom to said first amplifier, whereby upon activation of said first amplifier the first said head activates the second triggering circuit of said series in response to information recorded on a first channel of said magnetic surface, and whereby said succeeding heads and triggering circuits of said series are actuated seriatum by the remaining channels of information of said surface.

8. An apparatus according to claim 7, including predetermined counters interposed respectively between certain of said amplifier outputs and the flip-flop circuits connected thereto, including those corresponding to the day, train, plane and the like, and type of reservation thereon desired, together with means for setting said counters in accordance with an accommodation desired.

9. An apparatus according to claim 8, including indicating counters connected to the outputs of certain of said amplifiers for identifying a particular unit of reservation selected.

10. An apparatus according to claim 7 wherein one flip-flop circuit of said series has its normally inactive output connected in multiple to the triggering circuits of a pair of normally inactive amplifiers, the reproducing heads connected to which respectively scan said two channels of information recording the number of available units of each type of accommodation; means connecting the outputs of said pair of amplifiers to a coincidence circuit whereby said coincidence circuit is activated upon concurrent passage of said pair of reproducing heads over magnetized areas; means including an erasure head, responsive to actuation of said coincidence circuit, for erasing one of said magnetized areas; and means including indicating counters connected to certain of said amplifiers and identifying the magnetized area so erased.

11. An apparatus according to claim 7 wherein predetermined counters are interposed between certain of said amplifier outputs and the flip-flop circuits respectively connected thereto, including those corresponding to the day, train, plane and the like, and type of reservation thereon desired, together with means for individually setting said counters in accordance with a desired reservation; and wherein one flip-flop circuit of said series has its normally inactive output connected in multiple to the triggering circuits of the pair of normally inactive amplifiers, the reproducing heads of which respectively traverse the channels of information recording the number of available units of each type of accommodation, said pair of amplifiers having their outputs connected to a coincidence circuit which is activated upon concurrent passage of said pair of reproducing heads over magnetized areas; means including an erasure head responsive to actuation of said coincidence circuit, for erasing one of said magnetized areas; and means including indicating counters for indicating and identifying the magnetized area so erased.

JOSEPH F. DUSEK.
ROBERT J. FALLERT.

REFERENCES CITED

The following references are of record in the file of this patent:

UNITED STATES PATENTS

| Number | Name | Date |
|---|---|---|
| 2,124,906 | Bryce | July 26, 1938 |
| 2,446,037 | Ammann et al. | July 27, 1948 |